J. T. PEDERSEN.
PIPE COUPLING.
APPLICATION FILED AUG. 5, 1914.
1,163,364.
Patented Dec. 7, 1915.
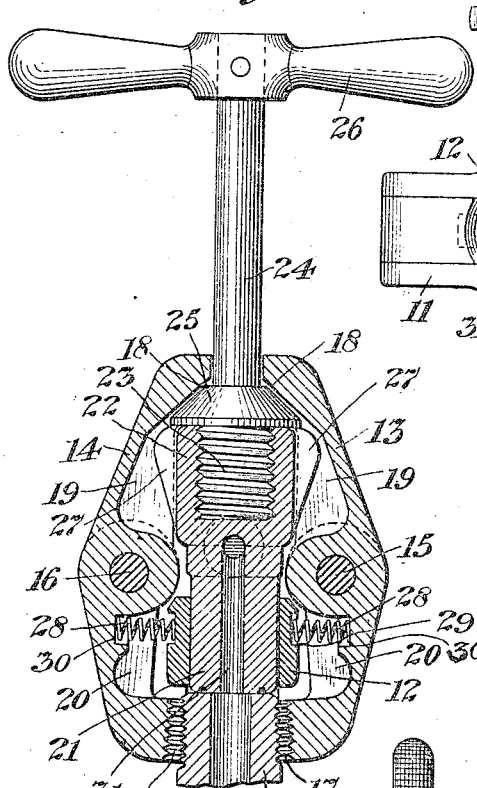
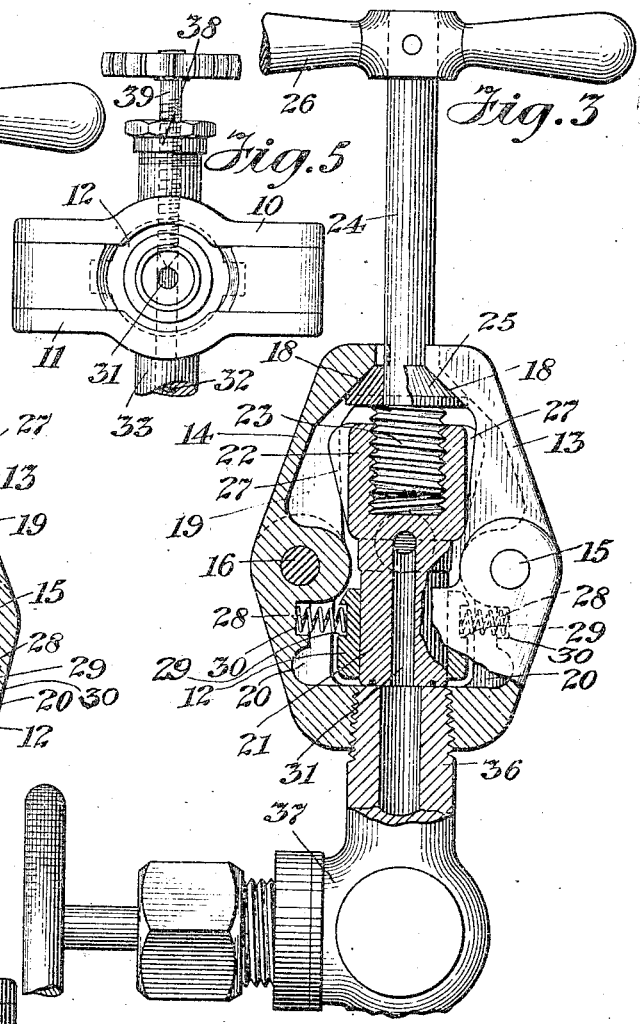
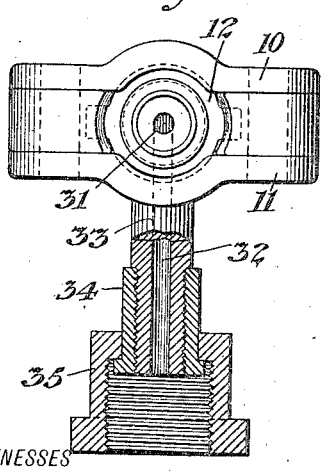
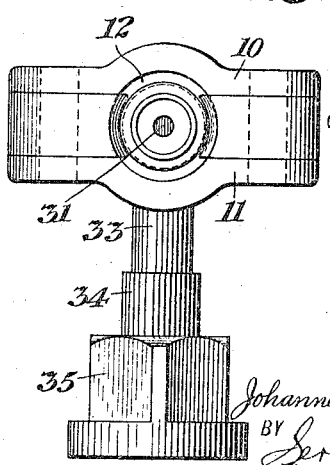
WITNESSES
Chas. F. Clagett
Bertha M. Allen
INVENTOR
Johannes Th. Pedersen
BY
HIS ATTORNEYS

UNITED STATES PATENT OFFICE.

JOHANNES TH. PEDERSEN, OF NEW YORK, N. Y.

PIPE-COUPLING.

1,163,364.  Specification of Letters Patent.  Patented Dec. 7, 1915.

Application filed August 5, 1914. Serial No. 855,110.

*To all whom it may concern:*

Be it known that I, JOHANNES TH. PEDERSEN, a citizen of the United States, residing at Flushing, in the borough and county of Queens, city and State of New York, have invented an Improvement in Pipe-Couplings, of which the following is a specification.

My present invention relates to a pipe coupling particularly adapted for use in charging gas tanks, such, for example, as are employed for carbonic acid gas in soda fountains, and like places, although, as will be understood, my improved pipe coupling is not limited to this particular use, as it may be employed for connecting pipes for any purpose whatsoever.

In the use of pipe couplings heretofore commonly employed to connect gas tanks and similar receptacles to supply reservoirs for the purpose of filling tanks, several operations have been necessary, as well in making the joint as in the breaking of the same, and much unnecessary time has been expended in making and breaking the joints with the pipe couplings heretofore employed, and also there has been considerable wear on the screw threaded ends of the pipe connections from the tanks, and also on the pipe connections from the reservoir, due, as will be understood, to the frictional contact with the members of the coupling.

The object of my present invention is the provision of a pipe coupling, in the use of which but a single operation is necessary in making, as well as in breaking, the joint between the coupling and the tank to be filled, whereby there is a considerable saving in the time consumed in making and breaking the joints, and the construction of my improved pipe coupling is such that while the screw threaded ends of the pipe connections from the tank are utilized there is no appreciable wear on the same, as will be hereinafter more particularly described.

In the drawing, Figure 1 is a sectional longitudinal cross section and a partial elevation of the pipe coupling made in accordance with my present invention, showing the end of the pipe connection from a tank to be filled, in position to be engaged by the coupling. Fig. 2 is a plan and partial cross section of the parts of the coupling as shown in Fig. 1. Fig. 3 is a view similar to Fig. 1, showing the parts of a coupling in engagement with the screw threaded end of the pipe connection from a tank to be filled, Fig. 4 is a partial plan of the parts as shown in Fig. 3, and Fig. 5 is a partial plan of a modified form of the invention.

By reference to the drawing, it will be seen that my improved pipe coupling preferably comprises a frame having oppositely disposed members 10 and 11, the corresponding ends of which are parallel to each other. The side members 10 and 11 of the frame are suitably connected by an intermediate member 12, which may be integral therewith or otherwise.

Within the parallel portions of the side members 10 and 11, I employ jaws 13 and 14. These jaws 13 and 14, are preferably pivoted to the parallel portions of the frame by pins 15 and 16, respectively, which pass through portions of the jaws and through the side members of the frame, in which latter they are suitably secured. Each jaw member, at one end thereof, is provided with a circularly recessed and interiorly screw threaded portion 17 and at its opposite end with an inner inclined or tapered face 18. In this end of each jaw, also, the same is provided with a recess 19 while in the opposite end there is a recess 20.

Passing through a bore provided therefor in the intermediate member 12, I employ a spindle 21. At one end, the spindle is provided with a socket 22, interiorly screw threaded to receive the threaded end 23 of a stem 24, which latter extends between the adjacent ends of the jaws 13 and 14 and at its extremity is provided with a handle 26, which is suitably connected thereto.

On the stem 24, adjacent the screw threaded end 23 thereof, I employ a collar 25, the surface of which is tapered and adapted to contact with the inner inclined faces 18 of the jaw members 13 and 14, and in order to prevent a relative turning movement between the spindle and the jaws, when the stem is turned, I prefer to provide the socket end of the spindle with oppositely disposed lugs 27, adapted to extend into and slide within the recesses 19 in the said jaws. Other and equivalent means, however, may be employed for this purpose.

In order to normally maintain the screw threaded ends of the jaws in an open position, as shown in Fig. 1, I also employ springs 28, each of which extends between the base of a recess 29, provided therefor in the outer surface of the intermediate member 12, and the base of the recess 30 in its corresponding jaw member, a portion of each of the said springs extending through the recess 20, in its corresponding jaw member. The spindle 21 is provided centrally with a bore 31, which connects with a bore 32 in a pipe connection 33, fixed on which there is a sleeve 34 and a nipple 35, by which these parts, as well as the coupling may be connected to the screw threaded end of the pipe connection leading from a reservoir, tank or other source of supply, for the material with which the tank, or other receptacle, is to be filled by the use of the improved coupling.

36 indicates the screw threaded end of a pipe connection, such as is commonly employed with carbonic acid gas tanks, and similar receptacles, and in which pipe connection there is also a suitable valve indicated at 37.

In the use of the hereinbefore described pipe coupling, the tank or other receptacle to be filled is placed in such a position that the end of the pipe connection 36 therefrom is in contact with the end of the spindle 21. Thereupon the jaws are closed so as to cause the screw threaded end portions thereof to engage the screw threads on the end of the pipe connection, and then the stem 22 is turned so that the conical surface of the collar 25 contacts with the inner inclined faces of the adjacent ends of the jaws to spread the same, which, as will be understood, causes the jaws to swing on their pivotal points, and the screw threaded ends thereof to securely grip the screw threaded end of the pipe connection, and this revoluble movement or turning of the stem 24 also moves the spindle 21, causing the same to slide in the intermediate member 12 so as to force its end into close contact with the end of the pipe connection to make a tight joint between them. Obviously, in breaking the joint, the stem 22 is turned in the opposite direction, and by the action of the springs 28 the jaw members are automatically released from the screw threaded end of the pipe connection. In this use of the coupling, and as will be apparent, after the end of the pipe connection 36 is secured between the screw threaded ends of the jaws and the end of the spindle brought into forcible contact with the end of the pipe connection, a valve in the pipe, secured to the nipple 35, as well as the valve 37, are opened, and then the gas, liquid, or other material, may flow from the reservoir, or other source of supply, into the tank to be filled, passing through the pipe connection 32 into the bore of the spindle 21, then into the pipe connection 36 and into the tank. It will be understood, however, that the pipe connection 36 and the valve 37 therein, as illustrated, are only diagrammatic, for the purpose of showing the use of my improved pipe coupling, inasmuch as the same is adapted for making connections between pipes for any purpose.

Also, as is illustrated in Fig. 5, it will be seen that I may employ a needle or other valve 38, associated with the spindle 21. The needle or other valve 38 is suitably connected to the spindle, and the stem 39 thereof turned so that its end will pass through the bore 31 in the spindle 21, and into the bore 32 in the connection 33, in order to control the extent to which the same is open and, when necessary, to shut the same entirely off. In the use of the valve associated with the spindle, it will be unnecessary to employ a valve or similar device in the pipe line to which the connection 33 is secured by its nipple 35.

I claim as my invention:

1. A pipe coupling comprising a frame, jaws pivoted therein so as to swing into engagement with the screw threaded end of a pipe connection, a spindle having a screw threaded socket at one end thereof, a stem having a screw threaded end in engagement with the said screw threaded socket, and means associated with the said stem for separating the said jaws at corresponding ends thereof and bringing the opposite ends into engagement with the screw threaded end of a pipe connection as the said spindle is advanced to engage the end of the pipe connection by turning the said stem.

2. A pipe coupling comprising a frame, jaws pivoted therein so as to swing into engagement with the screw threaded end of a pipe connection, a spindle having a screw threaded socket at one end thereof, a stem having a screw threaded end in engagement with the said screw threaded socket, and a collar having a conical face adapted to engage the inner portions of the said jaws at corresponding ends thereof to spread the same and bring the opposite ends into engagement with the sides of the pipe connection while the said spindle is brought into positive engagement with the end of the pipe connection by turning the said stem.

3. A pipe coupling comprising oppositely disposed side members, an intermediate member connecting the same, jaws pivotally connected between the said side members to swing into engagement with the end of a pipe connection, and devices for simultaneously making a tight joint with the end of the pipe connection and causing the said jaws to grip the same at opposite sides.

4. A pipe coupling comprising oppositely disposed side members, an intermediate member connecting the said side members, jaws pivotally connected in the said side members and adapted to swing into engagement with the screw threaded end of a pipe connection, a spindle movable longitudinally in the said intermediate member, and means for simultaneously moving the said spindle to bring the same into engagement with the end of a pipe connection and swing the said jaws into engagement with the sides thereof.

which are parallel, jaws pivotally connected between the parallel portions of the said side members, an intermediate member connecting the said side members, a spindle journaled to slide longitudinally in the said intermediate member and having a bore extending partially therethrough in a longitudinal direction, a pipe connected to and extending from one side of the said spindle and making communication with the bore therein, a valve connected to the opposite side of the said spindle and adapted to open and close communication between the said pipe and the bore in the spindle, a screw threaded socket on one end of the spindle, a stem having a screw threaded end in engagement with the said screw threaded socket, and a collar having a conical surface secured on the said stem and adapted to engage corresponding ends of the said jaws to separate the same and thereby close the opposite ends of the said jaws into engagement with the end of a pipe connection.

14. A pipe coupling comprising a frame, jaws pivotally mounted therein to swing into engagement with the screw threaded end of a pipe connection, a spindle movable longitudinally in the said frame and having a bore extending partially therethrough in a longitudinal direction, a pipe connected to and extending at right angles from the said spindle, means for preventing a relative revoluble movement between the said spindle and the frame and jaws, and devices for simultaneously swinging the said jaws and moving the spindle longitudinally to bring the former into contact with the end of a pipe connection and the latter to securely grip the opposite sides thereof.

15. A pipe coupling comprising a frame, jaws pivotally mounted therein to swing into engagement with the screw threaded end of a pipe connection, a spindle movable longitudinally in the said frame and having a bore extending partially therethrough in a longitudinal direction, a pipe connected to and extending at right angles from the said spindle, means for preventing a relative revoluble movement between the said spindle and the frame and jaws, a valve also secured to and extending from the said spindle and adapted to open and close communication between the said pipe and the bore in the spindle, and devices for simultaneously swinging the said jaws and moving the spindle longitudinally to bring the former into contact with the end of a pipe connection and the latter to securely grip the opposite sides thereof.

Signed by me this 31st day of July, 1914.

JOHANNES TH. PEDERSEN.

Witnesses:
 BERTHA M. ALLEN,
 MARIE D. WOHLERS.